(12) United States Patent
Balakrishnan et al.

(10) Patent No.: US 8,717,917 B1
(45) Date of Patent: May 6, 2014

(54) SYSTEM AND METHOD FOR MANAGING TRANSACTION DATA IN A MOBILE COMMUNICATION NETWORK USING SELECTIVE SAMPLING

(75) Inventors: Subramanian Balakrishnan, Cupertino, CA (US); Strafford Wentworth, Saratoga, CA (US)

(73) Assignee: Openwave Mobility, Inc., Redwood City, CA (US)

( * ) Notice: Subject to any disclaimer, the term of this patent is extended or adjusted under 35 U.S.C. 154(b) by 417 days.

(21) Appl. No.: 13/095,826

(22) Filed: Apr. 27, 2011

Related U.S. Application Data

(60) Provisional application No. 61/328,635, filed on Apr. 27, 2010, provisional application No. 61/366,507, filed on Jul. 21, 2010.

(51) Int. Cl.
*H04L 12/26* (2006.01)

(52) U.S. Cl.
USPC ............ 370/252; 370/329; 370/341; 370/389

(58) Field of Classification Search
USPC ......... 370/252, 328, 338, 465, 329, 341, 389; 703/21; 705/14; 707/9, 602
See application file for complete search history.

(56) References Cited

U.S. PATENT DOCUMENTS

| | | | |
|---|---|---|---|
| 8,380,657 B2 * | 2/2013 | Shaik et al. | 707/602 |
| 2004/0267751 A1 * | 12/2004 | Dill et al. | 707/9 |
| 2006/0235675 A1 * | 10/2006 | Oslake et al. | 703/21 |
| 2008/0097850 A1 * | 4/2008 | Kristal et al. | 705/14 |
| 2009/0119172 A1 * | 5/2009 | Soloff | 705/14 |

\* cited by examiner

*Primary Examiner* — Brian D Nguyen
*Assistant Examiner* — Toan Nguyen

(57) ABSTRACT

A system and method for managing transactional data in a mobile communication network utilizes selectively sampling of a portion of data of transactions to and from mobile communication devices of the mobile communication network. An extract, transform and load process is then performed one the sampled data of the transactions and the resulting data is stored in a warehouse database, which can be used for analytics reporting.

15 Claims, 12 Drawing Sheets

SYSTEM AND METHOD FOR MANAGING TRANSACTION DATA IN A MOBILE COMMUNICATION NETWORK USING SELECTIVE SAMPLING

CROSS-REFERENCE TO RELATED APPLICATION

This application is entitled to the benefit of Provisional U.S. Patent Application Ser. No. 61/328,635, filed Apr. 27, 2010, and Provisional U.S. Patent Application Ser. No. 61/366,507, filed Jul. 21, 2010, which are both incorporated herein by reference.

BACKGROUND

Analytics solutions for a mobile communication network need to process large amount of data and produce summary dashboards, reports and insights. As the volume of data through the mobile communication network increases, the cost of processing and storage for analytics solutions could become prohibitive.

Existing analytics solutions include using a full blown data warehouse and applying customer rules after data of all the transactions is stored in the data warehouse. These solutions are not affordable for many customers and may not have high return on investment (ROI) since all the transactional data is stored in the data warehouse. In addition, these solutions are not efficient because the volume of data in the data warehouse and the extract, transform, and load (ETL) processing time are independent of the rules from the customer.

In view of the above concerns, there is a need for a system and method for managing transactional data in a mobile communication network in an efficient and cost effective manner.

SUMMARY

A system and method for managing transactional data in a mobile communication network in accordance with embodiments of the invention utilizes selectively sampling of a portion of data of transactions to and from mobile communication devices of the mobile communication network. An extract, transform and load process is then performed one the sampled data of the transactions and the resulting data is stored in a warehouse database, which can be used for analytics reporting.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1:
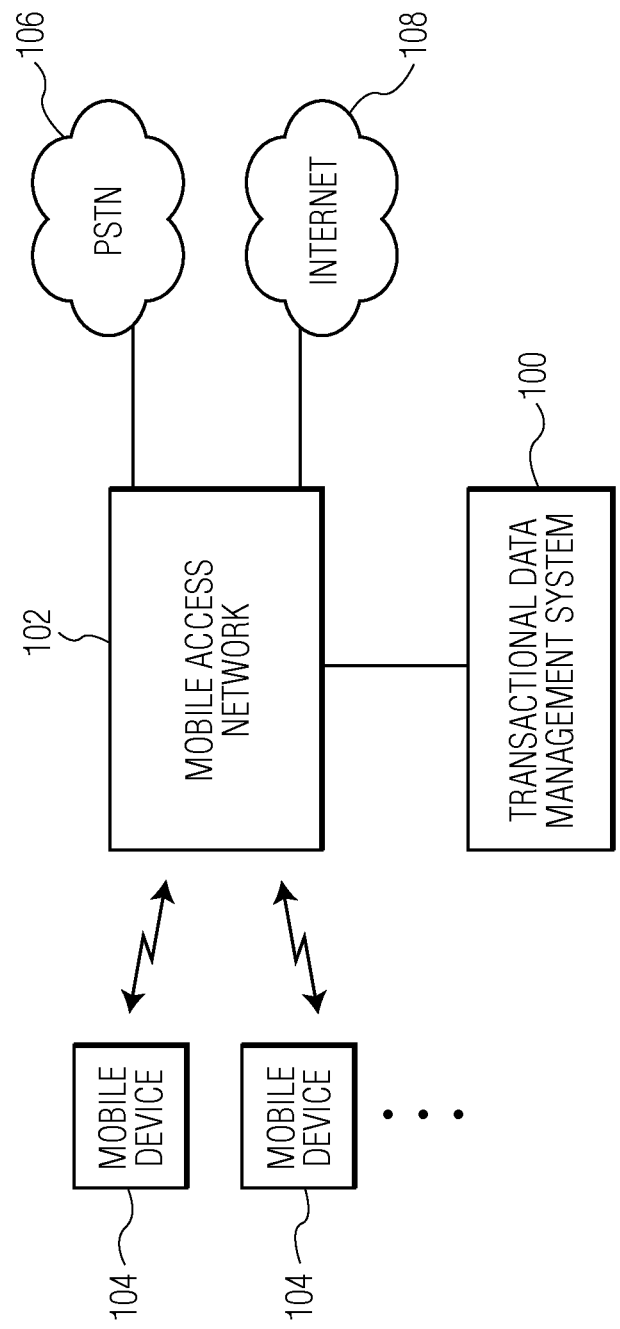
FIG. 1 is a block diagram of a mobile communication network that includes a transactional data management system in accordance with an embodiment of the invention.

Turning now to FIG. 1, a mobile communication network that includes a transactional data management system 100 in accordance with an embodiment of the invention is shown. As shown in FIG. 1, the mobile communication network includes a mobile access network 102, which allows mobile communication devices 104 to access the public switched telephone network (PSTN) 106 and/or the Internet 108 via the mobile access network. The mobile access network may also be connected to other networks (not shown), such as private telephone networks and/or data networks. In the illustrated embodiment, the transactional data management system is connected to the mobile access network. As described in more detail below, the transactional data management system operates to selectively sample transactional data through the mobile access network, which would typically be data related to transactions to and from the mobile communication devices, for storage and analytical processing so that the cost of storing and processing the transactional data can be reduced. In some embodiments, the selectively sampling of the transactional data through the mobile access network may be tailored for custom rules of one or more customers. Thus, in these embodiments, only the transactional data through the mobile access network that is relevant to these custom rules may be sampled to reduce the cost of storing and process without compromising the integrity of the transactional data used for analytical processing.

The mobile access network 102 can be any type of a mobile access network, such as a Universal Mobile Telecommunication System (UMTS) network or a CDMA2000 network, which provides communication services for the mobile communication devices 104. The mobile communication devices are wireless mobile devices that are subscribed to the communication services of the mobile access network. The mobile communication devices can be any type of wireless mobile devices, such as laptop computers, cell phones, smart-phones, personal digital assistants (PDAs) and netbooks. The mobile communication devices may be Internet-enabled devices. Thus, some of the mobile communication devices can access the Internet 108 via the mobile access network. Since the mobile access network provides communication services, including access to the Internet, the mobile access network handles and processes various data related to communications to and from the mobile communication devices. In an embodiment, the transactional data management system is configured to sample and process transactions related to the mobile access network in the form transactional data or log files. For example, transactional data or information may be data related to voice calls supported by the mobile access network and data related to other multimedia communications that are supported by the mobile access network, which may include audio and video data. The following is an example of data or information included in a log file for a single transaction to and from one of the mobile communication devices through the mobile access network.

| | |
|---|---|
| AccountRecord:HTTP_NGP:1000 2009-02-20 15:21:29 | [transaction type] |
| RecordSize: 926 | [size of record] |
| SchemaName MEP_HTTP_RECORD | [type of schema] |
| protocolVersion 1.0 | [software version that generated log file] |
| hostName | [name of host that generated the log file] |
| recordDiscriminator | [log file marker] |
| deviceIP | [IP address of mobile device] |
| devicePort 33938 | [port of mobile device] |
| deviceBytesIn 0 | [number of bytes from mobile device to host] |
| deviceBytesOut 0 | [number of bytes to mobile device from host] |
| internetBytesIn 0 | [number of bytes to host from source website] |
| contentDelivered true | [delivery success flag] |
| protocol http | [type of protocol] |
| timeZone 18000 | [time zone of the host] |
| requestReceivedTime 1227194489 | [request received time] |
| internetLatency 3 | [latency between host and source website] |
| clientResponseSendTime 1227194489 | [latency between mobile device and host] |
| txnCompleteTime 1227194489 | [time when transaction completed] |
| requestURI | [type of request] |
| method GET | [type of method] |
| statusToClient 302 | [status sent from host to mobile device] |
| statusFromOrigin 302 | [status sent from source website to host] |
| protocolType HTTP/1.1 | [HTTP protocol type] |
| subId | [subscriber identification of mobile device] |
| originContentLength 0 | [length of response] |
| reqHdrs.userAgent Sanyo-SCP6600CA NetFront/ 3.1 MMP/2.0 Mozilla/4.0 | [data generated by browser of mobile device] |
| seData.0.seName AUTHENTICATION | |
| seData.1.seName AUTHORIZATION | |
| seData.2.seName BasicACL | |
| seData.3.seName DEVICE_MGMT | |
| seData.4.seName HDREXPORT seData.5.seName HDRIMPORT seData.6.seName HDRMANIPULATION seData.7.seName IDENTITY seData.8.seName PLAN_MANAGEMENT | |

-continued

```
seData.9.seName URLALIASING planNames
Custom:wap2 Subscriber:MobileBrowserPlan
System:System
```

The transactional data management system 100 is connected to one or more nodes in the mobile access network 102 to access the transactional data flowing through these nodes in the mobile access network. As used herein, nodes in the mobile access network are any locations in the mobile access network through which the transactional data is flowing. The nodes in the mobile access network may include network devices or equipment, such as Hypertext Transfer Protocol (HTTP) gateway, a video optimizer and/or a deep packet inspection (DPI) system. The nodes may also be points along data transmission paths in the mobile access network. The transactional data management system is configured to access and selectively sample the transactional data flowing through these nodes to extract some portion of all the transactional data such that less than the data of all the transactions is collected. That is, the transactional data management is configured to selectively extract less than all of the transactional data flowing through the nodes. The sampled transactional data can then be stored and/or further processed.

In some embodiments, the transactional data management system 100 utilizes a scalable architecture that allows a user to choose a particular implementation to match the analytics needs of the user. Having a flexible architecture allows the user to use key features of data analysis without having to store and process a large volume of transactional data. Thus, the transactional data management system can be used to store all the transactional data in a traditional data warehouse with complete ad hoc querying capabilities or sampled data with key ad hoc reporting with or without aggregated data for standard reports, as described in detail below.

Figure 2:
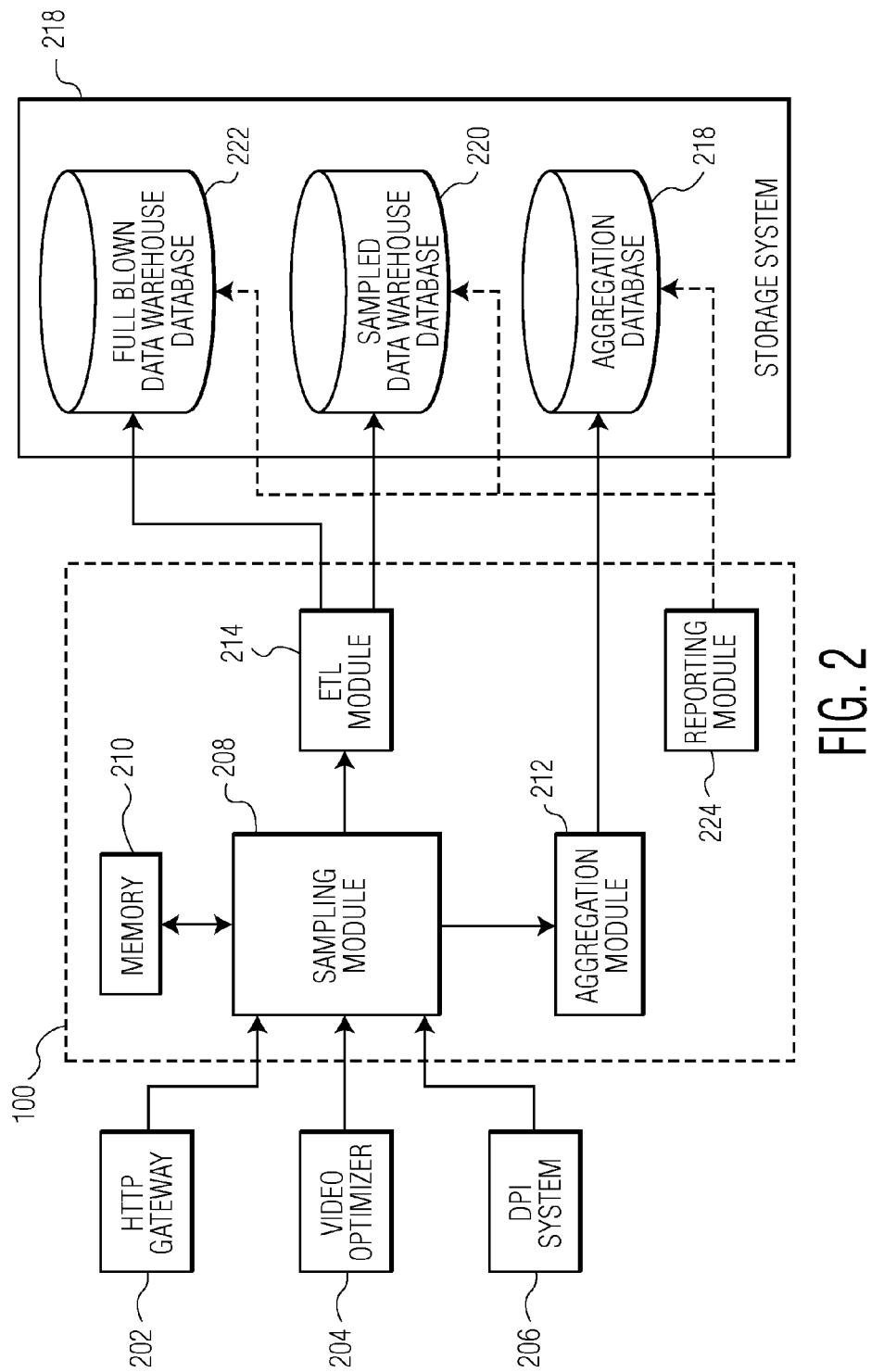
FIG. 2 is a block diagram of the transactional data management system, which shows components of the transactional data management system in accordance with an embodiment of the invention.

Turning now to FIG. 2, the components of the transactional data management system 100 in accordance with an embodiment of the invention are shown. In FIG. 2, some components of the mobile access network 102 are also shown to better describe the transactional data management system. In particular, a HTTP gateway 202, a video optimizer 204 and a DPI system 206 of the mobile access network are shown. These components of the mobile access network process the data of the transactions to and from the mobile communication devices 104 through the mobile access network. Thus, the transactional data management system can have access to all the transactional data through the mobile access network via one or more of these components. Although, the transactional data management system is shown in FIG. 2 as being connected to a single HTTP gateway, a single video optimizer and a single DPI system to receive transactional data, the transactional data management system may be connected to multiple HTTP gateways, multiple video optimizers and/or multiple single DPI systems. In other embodiments, the transactional data management system may be connected to other components of the mobile access network to access the transactional data flowing though the mobile access network.

As shown in FIG. 2, the transactional data management system 100 includes a sampling module 208, memory 210, an aggregation module 212 and an extract, transform and load (ETL) module 214. The sampling module is configured to selectively sample the data of transactions flowing through the mobile access network 102, for example, through the HTTP gateway 202, the video optimizer 204 and/or the DPI system 206, using one or more sampling rules, which is stored in the memory 210. The selective sampling process performed by the sampling module results in a portion of the data of all the transactions being sampled or collected such that less than all the data of the transactions is collected. The sampled transactional data is transmitted to the ETL module for processing. If all the transactional data is desired, the sampling module may simply allow the data of all the transactions to be transmitted to the ETL module without any sampling of the transactional data. In the illustrated embodiment, the sampled transactional data is also transmitted to the aggregation module, which aggregates one or more types of transactional data to produce aggregation data of transactions. The aggregation data is stored in an aggregation database 216 within a storage system 218. In the illustrated embodiment, the storage system is external to and not part of the transactional data management system. However, in other embodiments, the storage system may be part of the transactional data management system. The storage system includes one or more storage devices, such as optical or magnetic storage disks, which may be located within a single computer system or distributed throughout multiple networked computer systems, to store data for the transactional data management system. The storage system may also store data for other systems.

The ETL module 214 of the transactional data management system 100 is configured to perform an extract, transform and load process on the transactional data collected by the sampling module 208 for warehouse storage. In an embodiment, the ETL module performs the extract, transform and load process in a known manner. Thus, operations of the ETL module are not described herein in detail. In this embodiment, the ETL module is configured to extract the collected transactional data that conforms to desired configuration, while rejecting the data that does not conform to the desired configuration. The ETL module is also configured to selectively transform the extracted data as needed using one or more processes and/or rules, and to check the extracted data for redundancy. The ETL module is also configured to load the resulting data into a database stored in the storage system 218. If the initial input data to the ETL module includes only the sampled transactional data, then the resulting data is loaded into a sampled data warehouse database 220 in the storage system. However, if the initial input data includes all the transactional data, then the resulting data is loaded into a full blown data warehouse database 222, which is similar to the database used in conventional analytics systems.

The databases 216, 220 and 222 in the storage system 218 are used to provide analysis of the data of transactions collected by the transactional data management system 100. In an embodiment, these databases are used to generate reports regarding the collected transactional data. Using the full blown data warehouse database 216, complete ad hoc reports can be generated. As used herein, "ad hoc reports" are reports regarding the collected transactional data in response to any query from users. However, as mentioned above, utilizing such a full blown data warehouse database results in significant cost in storage and processing. However, using the sampled data warehouse database 220 instead of the full blown data warehouse database, key ad hoc reports can be generated. As used herein, "key ad hoc reports" are reports regarding the collected transactional data in response to limited key query from users. The limitation on the types of reports that can be generated from the sampled data warehouse database depends on the sampled transactional data in the sampled data warehouse database, which depends on the rules used for the sampling. Thus, by customizing the rules for sampling, the transactional data management system 100 can be tailored to the needs of the users. The aggregation database 216 can be used to generate standard reporting regarding the data selected for aggregation. As an example, the aggregation database may be used to generate a report that specifies top twenty (20) websites visited by a set of users of mobile communication devices for which the data of transactions has been sampled. Alternatively, the data of all the transactions may be used to produce the aggregation data for standard reporting, e.g., top 20 websites visited by all users.

In an embodiment, the processing of the data in one or more of the databases to generate reports is performed using a reporting tool that is external to the transactional data management system 100. As an example, the reporting tool may be based on Open Database Connectivity (ODBC) or Java Database Connectivity (JDBC). The reporting tool is used to access the databases 216, 220 and 222 in the storage system 216 to generate the desired reports. However, in some embodiments, the transactional data management system may include a reporting module 224 that is configured to access the databases in the storage system and to generate the desired reports when requested by users. The users may access the reporting module using any appropriate interfaces that can connect and communicate with the reporting module to send reporting requests to the reporting module and receive the resulting reports from the reporting module.

The operation of the transactional data management system 100 in accordance with an embodiment of the invention is now described. In this embodiment, the transactional data management system is configured to generate only the sampled data warehouse database 220 and the aggregation database 216. The sampling module 208 is initially configured based on user ad hoc query needs and aggregation information needs. The sampling module iterates through the data of all the transactions accessed by the transactional data management system from the mobile access network 102, e.g., from the HTTP gateway 202, the video optimizer 204 and/or the DPI system 206, and decides if the data for a particular transaction is to be included in the sampling. During this process, the sampling module learns about one or more criteria to be used for sampling, which are defined by one or more sampling algorithms, and updates bookkeeping data and the sampling criteria data, which are stored in the memory 210 or in another storage device. The sampled transactional data is then sent to the ETL module 214 for extraction, transformation and loading. At the ETL module, the data for the sampled transactions is checked against duplicates so that each sampled transaction is unique and stamped with an identifier for each sampling algorithm that selected the transaction. The sampled transactional data is then sent to the storage system 218 to be stored in the sampled data warehouse database 220, and/or may be further processed. The sampled transactional data from the sampling module is also sent to the aggregation module 212, which aggregates one or more types of transactional data to produce aggregation data of transactions. The aggregation data is then sent to the storage system to be stored in the aggregation database, and/or may be further processed.

Figure 3:
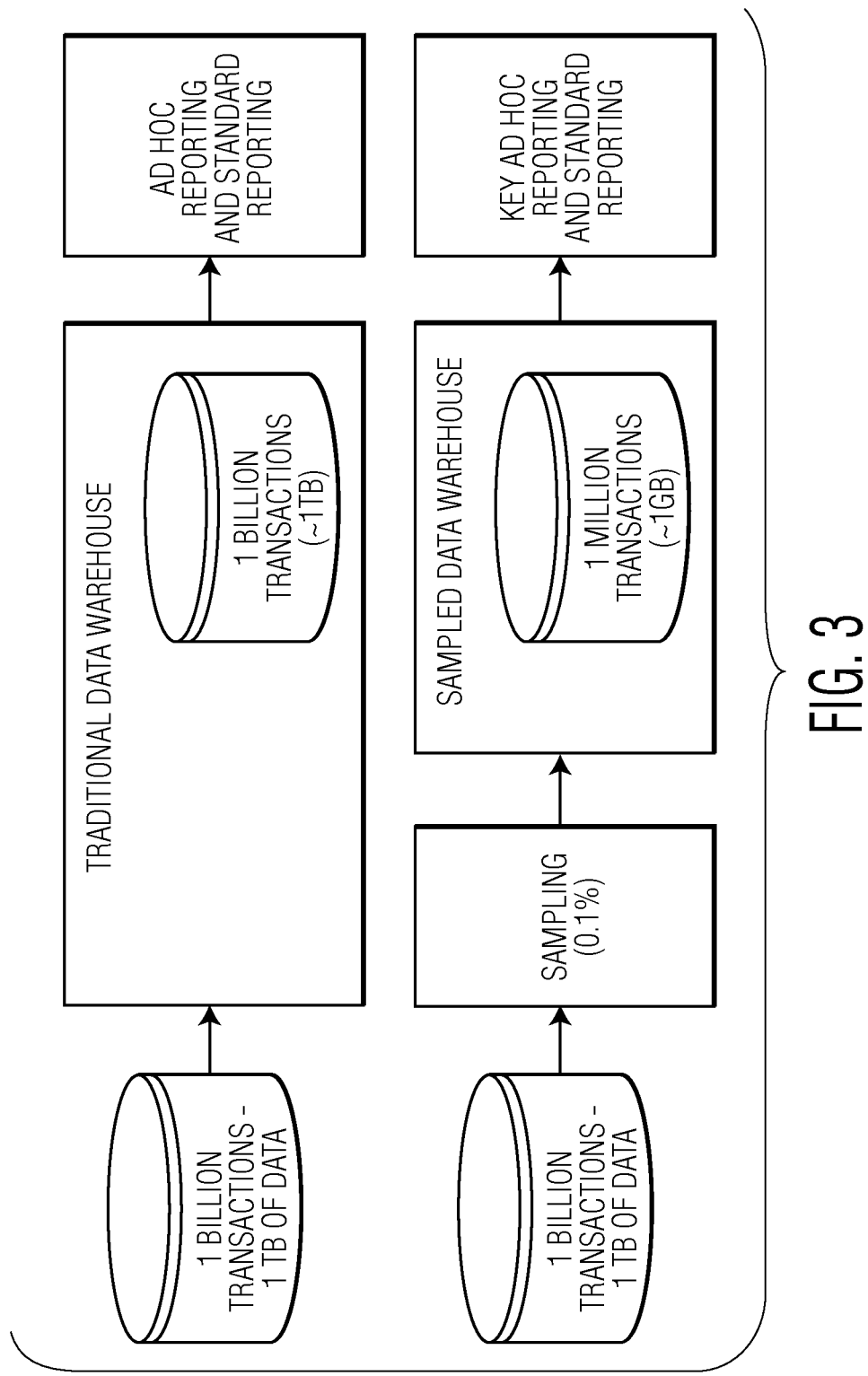
FIG. 3 illustrates the reduction of data size that can be realized by the use of the transactional data management system of FIG. 1 using 0.1% sampling in accordance with an embodiment of the invention.

FIG. 3 illustrates the reduction of data size that can be realized by the use of the transactional data management system 100 using 0.1% sampling in accordance with an embodiment of the invention. As shown in FIG. 3, the data size can be reduced from 1 Terabyte (TB) to 1 Gigabyte (GB) based on 0.1% sampling. Analysis shows that fairly accurate report data, such as top Uniform Resource Locators (URLs), can be generated by processing the data for only 1% of the total transactions.

In an embodiment, the sampling process executed by the sampling module 208 includes sampling M transactions out of N transactions, where M and N are positive integer and where M is much smaller than N, which is a large number. For example, N may be 1,000 or larger and M may be 1 to 20 depending on N. In addition, the sampling process executed by the sampling module may also be based on one or more user-defined criteria, such as user identification (ID), associated with M transactions selected for sampling. The sampling process executed by the sampling module in accordance with this embodiment of the invention is illustrated in the flow diagram of FIG. 4.

Figure 4:
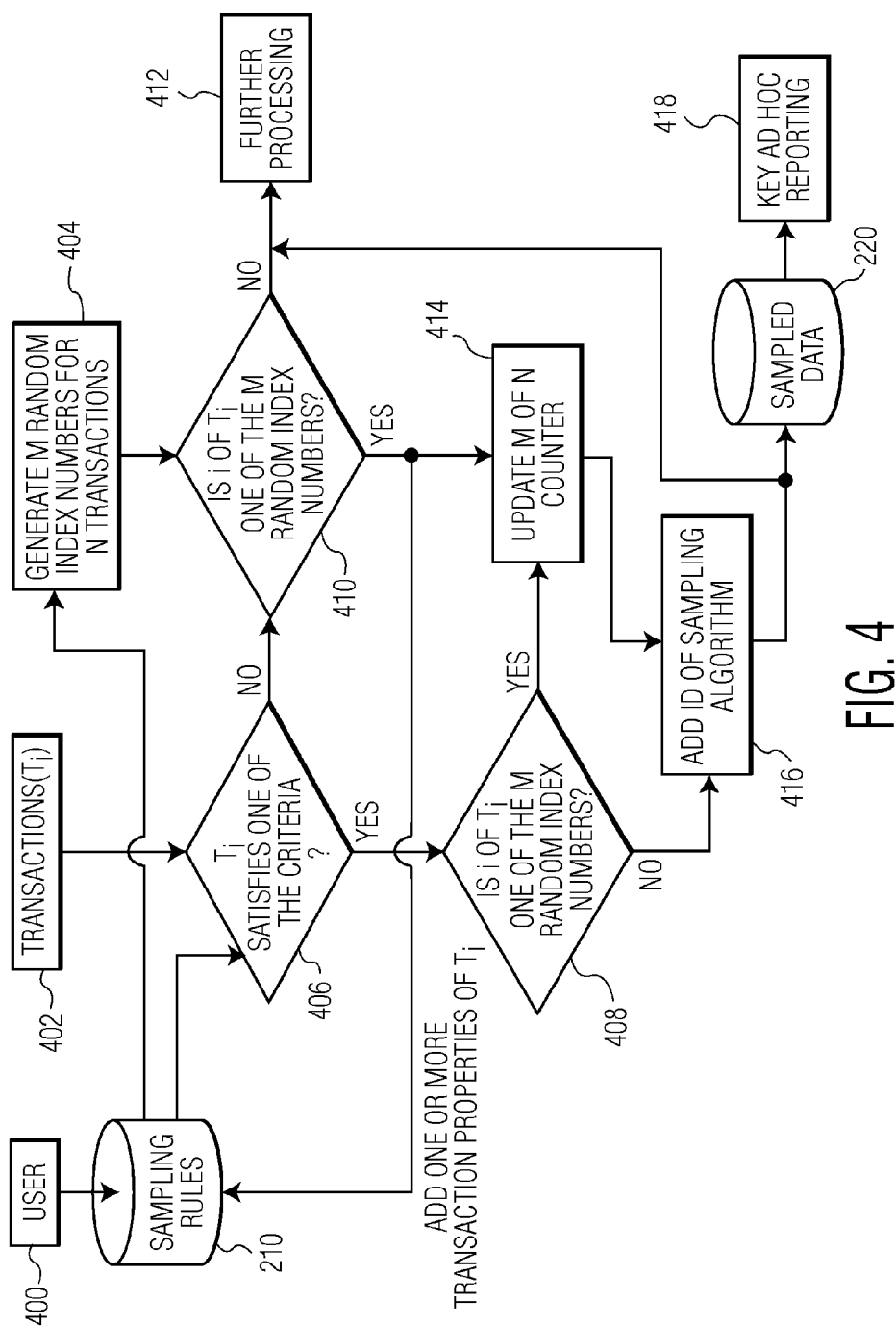
FIG. 4 is a flow diagram of a sampling process executed by a sampling module of the system of FIG. 1 in accordance with an embodiment of the invention.

As shown in FIG. 4, rules for the sampling process performed by the sampling module 208 are set by a user 400 and stored in the memory 210. The rules for the sampling process include the M and N values and may also include one or more user-defined criteria, such as user ID, associated with transactions ($T_i$) 402. At block 404, the sampling module generates M random index numbers for N transactions using the values of M and N stored in the memory.

At block 406, a determination is made by the sampling module 208 whether the current transaction $T_i$ being processed satisfies one of the sampling criteria stored in the memory 210. If yes, then the process proceeds to block 408. If no, then the process proceeds to block 410. At block 408, a determination is made by the sampling module whether i of the current transaction $T_i$ is one of the M random index numbers. If yes, then the process proceeds to block 414. If no, then the process proceeds to block 416.

At block 410, a determination is made by the sampling module 208 whether i of the current transaction $T_i$ is one of the M random index numbers. If no, then the process proceeds to block 412, where the data for the current transaction may be further processed. However, if yes, then the process proceeds to block 414, where an M of N counter, which may be located in the sampling module, is updated. Also, one or more transaction properties of the current transaction, which correspond to one or more user-defined criteria stored in the memory 210, are added to the sampling rules to be subsequently used to determine whether a transaction satisfies one of the criteria for the sampling process. Next, at block 416, the identification (ID) of the sampling algorithm used to select the current transaction is added to the data of the transaction. The data of the current transaction is then processed by the ETL module 214 to be stored in the sampled data warehouse database 220, which can then be used for key ad hoc reporting, at block 418. The data of the current transaction can also be sent for further processing.

Figure 5:
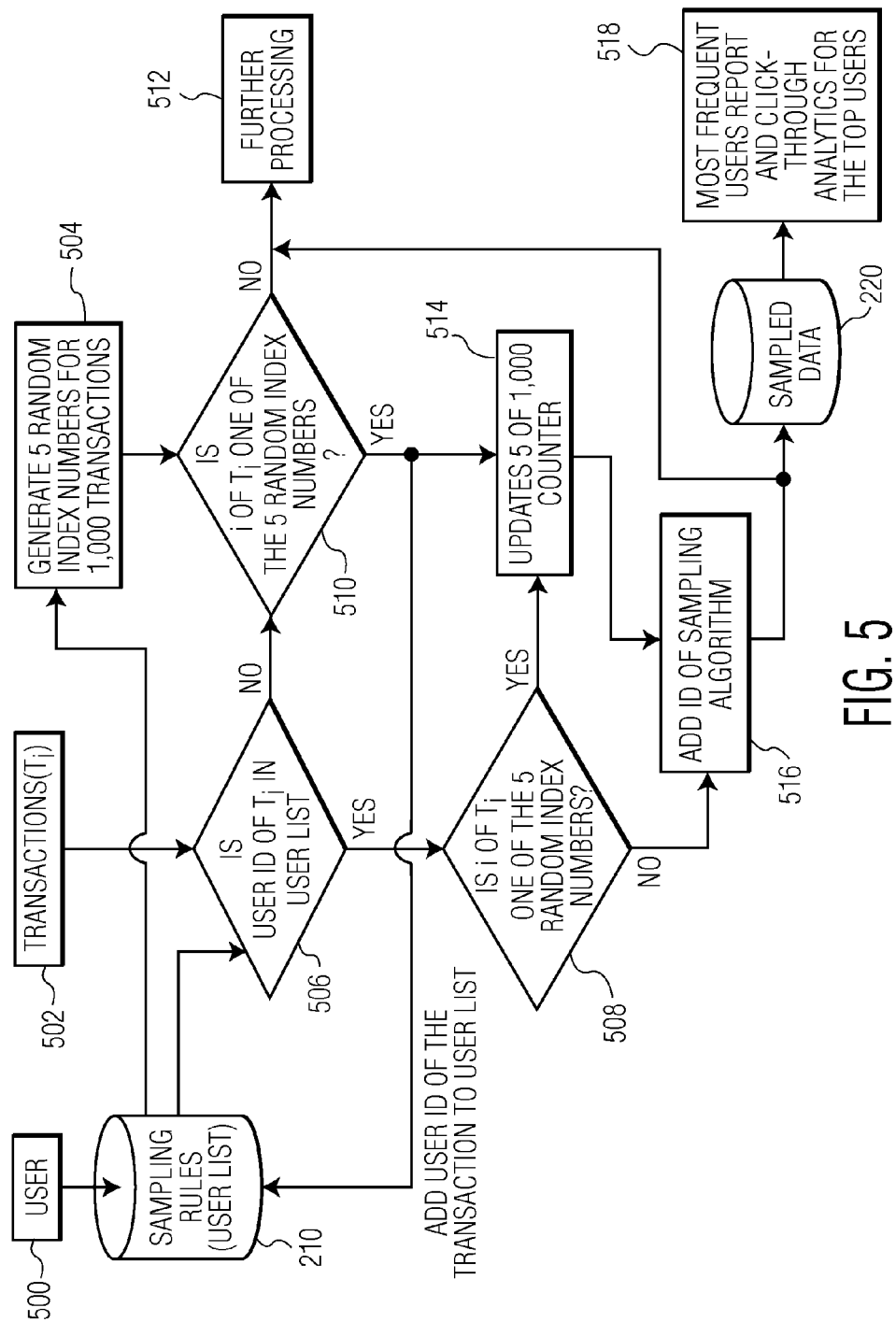
FIG. 5 is a flow diagram of an example of the sampling process executed by the sampling module in accordance with an embodiment of the invention.

The above sampling process executed by the sampling module 208 is further described using an example. In this example, the rules for the sampling process are set such that the value of M is 5 and the value of N is 1,000, and user-defined sampling criteria are the user IDs of the transactions selected using M random index numbers. The flow diagram for this example is illustrated in FIG. 5.

Initially, the rules for the sampling process performed by the sampling module 208 are set by a user 500, and stored in the memory 210. In this example, the M and N values are set to 5 and 1,000, respectively, to define the sampling rate of the sampling module. In addition, the user-defined sampling criteria are set to user IDs associated with transactions ($T_i$) 502. Thus, a user list is created and stored in the memory as part of the sampling rules. In an optional implementation, the user may add/remove one or more user IDs in the user list. At block 504, the sampling module 208 generates 5 random index numbers for 1,000 transactions using the values of M=5 and N=1,000 stored in the memory.

At block 506, a determination is made by the sampling module 208 whether the user ID of the current transaction $T_i$ being processed is in the user list stored in the memory 210. If yes, then the process proceeds to block 508. If no, then the process proceeds to block 510. At block 508, a determination is made by the sampling module whether i of the current transaction $T_i$ is one of the 5 random index numbers. If yes, then the process proceeds to block 514. If no, then the process proceeds to block 516.

At block 510, a determination is made by the sampling module 208 whether i of the current transaction $T_i$ is one of the 5 random index numbers. If no, then the process proceeds to block 512, where the data for the current transaction may be further processed. However, if yes, then the process proceeds to block 514, where a 5 of 1000 counter, which may be located in the sampling module, is updated. Also, the user ID of the current transaction is added to the user list stored in the memory 210. Next, at block 516, the ID of the sampling algorithm used to select the current transaction is added to the data of the current transaction. The data of the current transaction is then processed by the ETL module 214 to be stored in the sampled data warehouse database 220, which can then be used for key ad hoc reporting. The key ad hoc reporting may include a report of most frequent users and click-through analytics for the predefined number of top users. The data of the current transaction can also be sent for further processing.

In this example, for the best case sampling with 5 out of 1000 transactions, which is 0.5% of all transactions, the needed reports for 1 billion transactions (~1 TB of data) can be generated with 5 million transactions (~5 GB of data).

The selection of transactions for the sampling process executed by the sampling module 208 in accordance with this embodiment of the invention is further described using another example. In this example, the rules for the sampling process are set such that M=2 and N=12 and the criteria are the user IDs of the selected transactions.

Figure 6A:
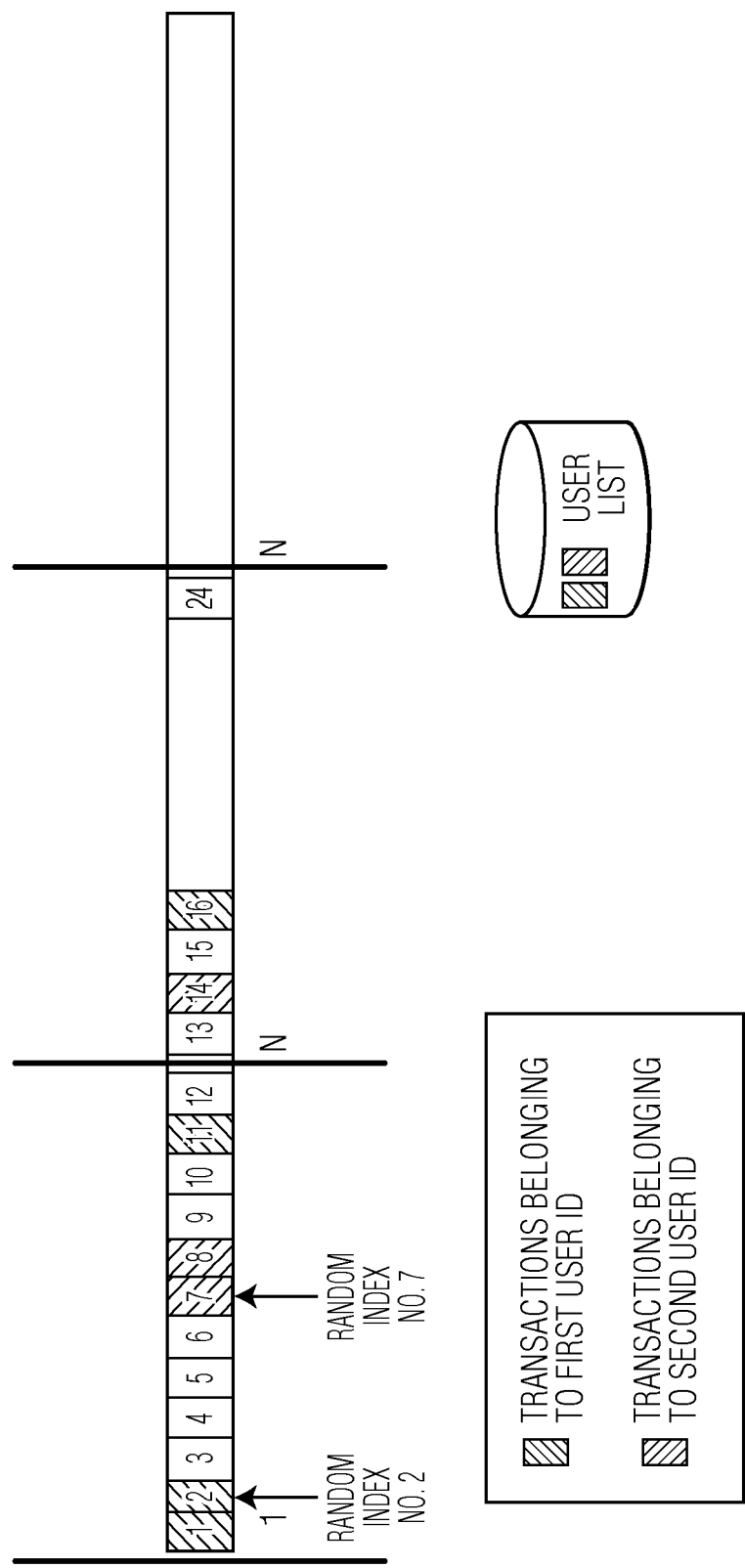
FIG. 6A illustrates a first iteration of a sampling process executed by the sampling module in accordance with an embodiment of the invention.

The first iteration of the sampling process is described with reference to FIG. 6A, which illustrates transactions 1-24. The first iteration of the sampling process involves processing only the first 12 transactions, i.e., transactions 1-12, since N=12. In this example, the two (M=2) random index numbers generated by the sampling module 208 are 2 and 7, which correspond to the second and seventh transactions of the transactions being processed in this iteration, i.e., the transactions 1-12. Also, in this example, transactions 1, 2 and 11 belong to first user ID and transactions 7 and 8 belong to second user ID. Based on these parameters, the sampled transactions for the first iteration of the sampling process are transactions 2, 7, 8 and 11. The transactions 2 and 7 are sampled because these transactions correspond to the two random index numbers. The transaction 8 is sampled because it has the same user ID as the transaction 7, i.e., the second user ID, and thus, the second user ID has been added to the user list as a criterion for transaction sampling, when the transaction 8 is considered. In this iteration, the transaction 1 is not sampled because the user ID for the transaction 2, i.e., the first user ID, has not yet been added to the user list when the transaction 1 is processed by the sampling module to determine whether the transaction 1 should be sampled.

Figure 6B:
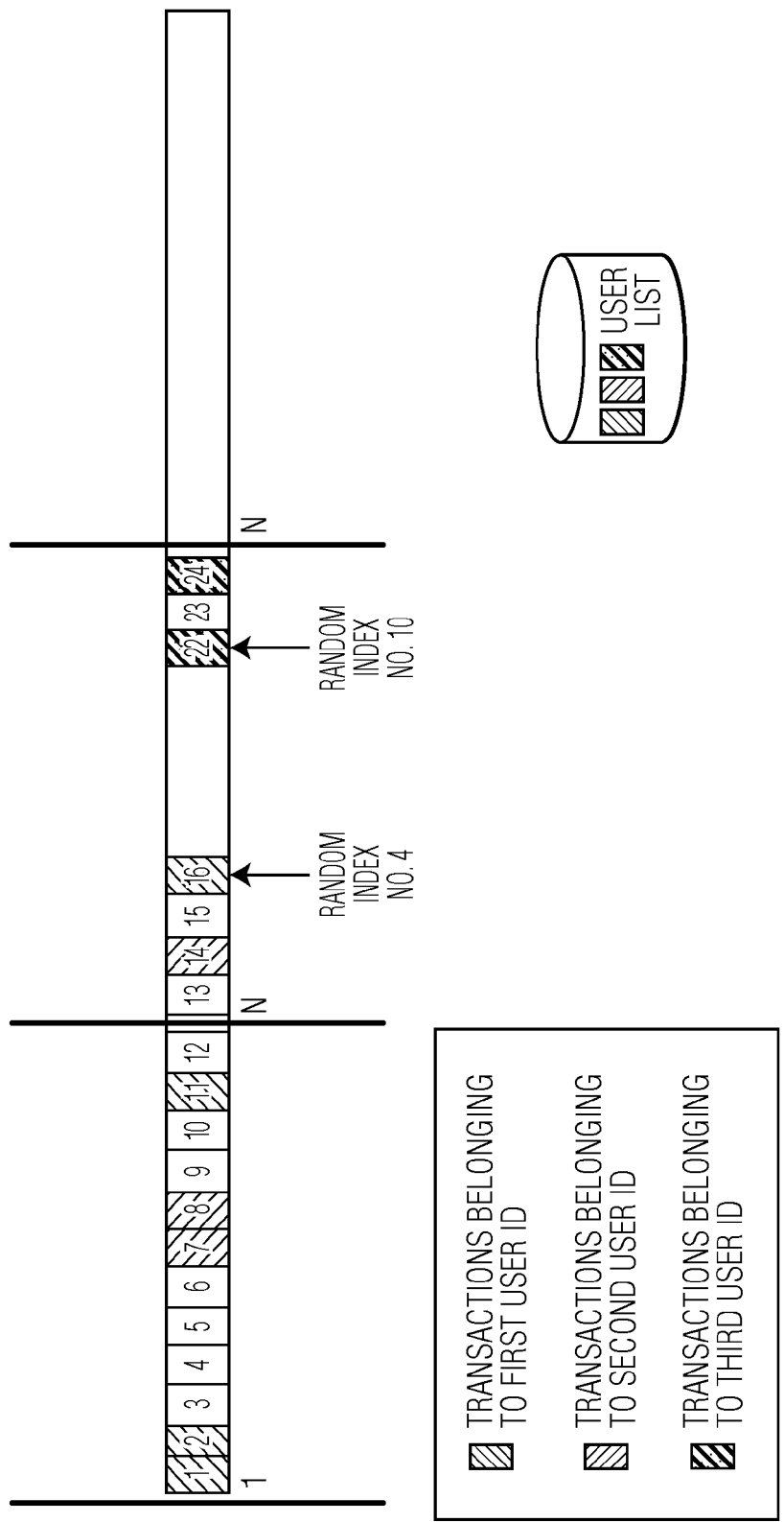
FIG. 6B illustrates a second iteration of the sampling process executed by the sampling module in accordance with an embodiment of the invention.

The second iteration of the sampling process is described with reference to FIG. 6B, which also illustrates transactions 1-24. The second iteration of the sampling process involves processing only the second 12 transactions, i.e., transactions 13-24, since N=12. For this second iteration, the two random index numbers generated by the sampling module are 4 and 10, which correspond to fourth and tenth transactions of the transactions 13-24 being processed in this iteration, i.e., the transactions 16 and 22. Also, in this example, the transaction 16 belongs to the first user ID, the transaction 14 belongs to the second user ID and the transactions 22 and 24 belong to a third user ID. Based on these parameters, the sampled transactions for the second iteration of the sampling process are the transactions 14, 16, 22 and 24. The transactions 16 and 22 are sampled because these transactions correspond to the two random index numbers. The transaction 14 is sampled because it has the same user ID as the transaction 7, i.e., the second user ID. The transaction 24 is sampled because it has the same user ID as the transaction 16, i.e., the third user ID, and thus, the third user ID has been added to the user list as a criterion for transaction sampling, when the transaction 24 is considered.

Figure 7:
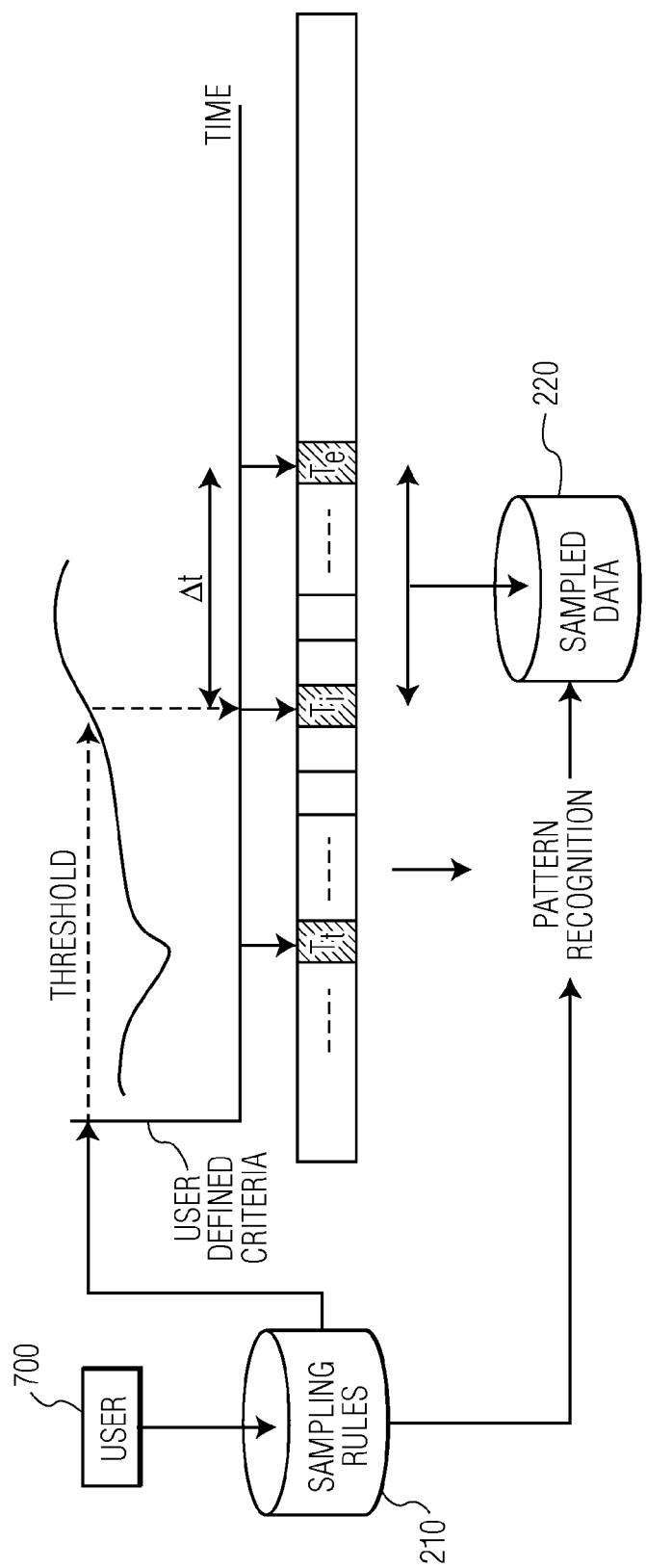
FIG. 7 illustrates a sampling process executed by the sampling module using static and dynamic thresholds in accordance with an embodiment of the invention.

In another embodiment, the sampling process executed by the sampling module 208 includes tracking one or more user-defined criteria so that when a particular criterion exceeds a user-defined threshold, which may be dynamic or static, the data for all transactions up to a user-defined limit is sampled. In addition, all the transactions that match patterns of interest are sampled. The sampling process in accordance with this embodiment of the invention is illustrated in FIG. 7. In FIG. 7, only one criterion and one corresponding threshold are being used for the sampling process. However, in other embodiments, more than one criterion and more than one corresponding threshold are used for the sampling process.

As shown in FIG. 7, a user 700 defines the rules for the sampling process by setting parameters for the sampling rules. In this embodiment, the user sets the criterion to be tracked and the corresponding threshold for the criterion. In addition, the user may also set a duration of time, $\Delta t$, which defines the length of time after the criterion being tracked exceeds the threshold during which the data of all the transactions are sampled. Furthermore, the user may also set one or more patterns of interest for sampling transactions that match one of these patterns. The user-defined parameters for the sampling rules are stored in the memory 210.

In operation, the sampling module 208 measures or tracks a signal that correspond to the user-define criterion. In FIG. 7, the transaction $T_t$ corresponds to the time when the measurement of the signal started, the transaction $T_i$ corresponds to the time when the signal exceeds the threshold and sampling starts, and the transaction $T_e$ corresponds to the time when the sampling stops based on the value of $\Delta t$. For the transactions between the transactions $T_t$ and $T_i$, including the transactions $T_t$ and $T_i$, the sampling module samples the data of all transactions that match one or more patterns of interest using one or more pattern recognition techniques. For the transactions between the transactions $T_i$ and $T_e$, including the transactions $T_i$ and $T_e$, which are defined by the $\Delta t$, the sampling module samples the data of all the transactions. The sampled transactional data is stored in the sampled data warehouse database 220.

As mentioned above, the user-defined threshold may be a static threshold or a dynamic threshold. A static or fixed threshold can be computed using a predetermined algorithm and the algorithm logic may be constructed based on the properties of the transactions. An example of using a static threshold for sampling is a use of a pre-determined filter that filters based the properties of the transactions. A dynamic threshold can be computed using algorithms that are dynamic and the algorithm logic may be based on the properties of the transactions. An example of using a dynamic threshold for sampling is a user of an algorithm that looks for patterns within the properties of the transactions and applies a weighted combination of filters based on the patterns observed. Both a static threshold based sampling and a dynamic threshold based sampling can be executed in parallel. For efficiency and accuracy of this sampling process, the following design considerations should be considered:
  a. Distributed sampling algorithms with central guidance (sampling criteria) data would need global cache with high consistency and availability.
  b. An algorithm specific and volume specific hashing algorithm to look up guidance data for sampling.
  c. For optimization purposes, should use in-memory databases (intermediate storage for the criteria values) wherever possible.

Figure 8:
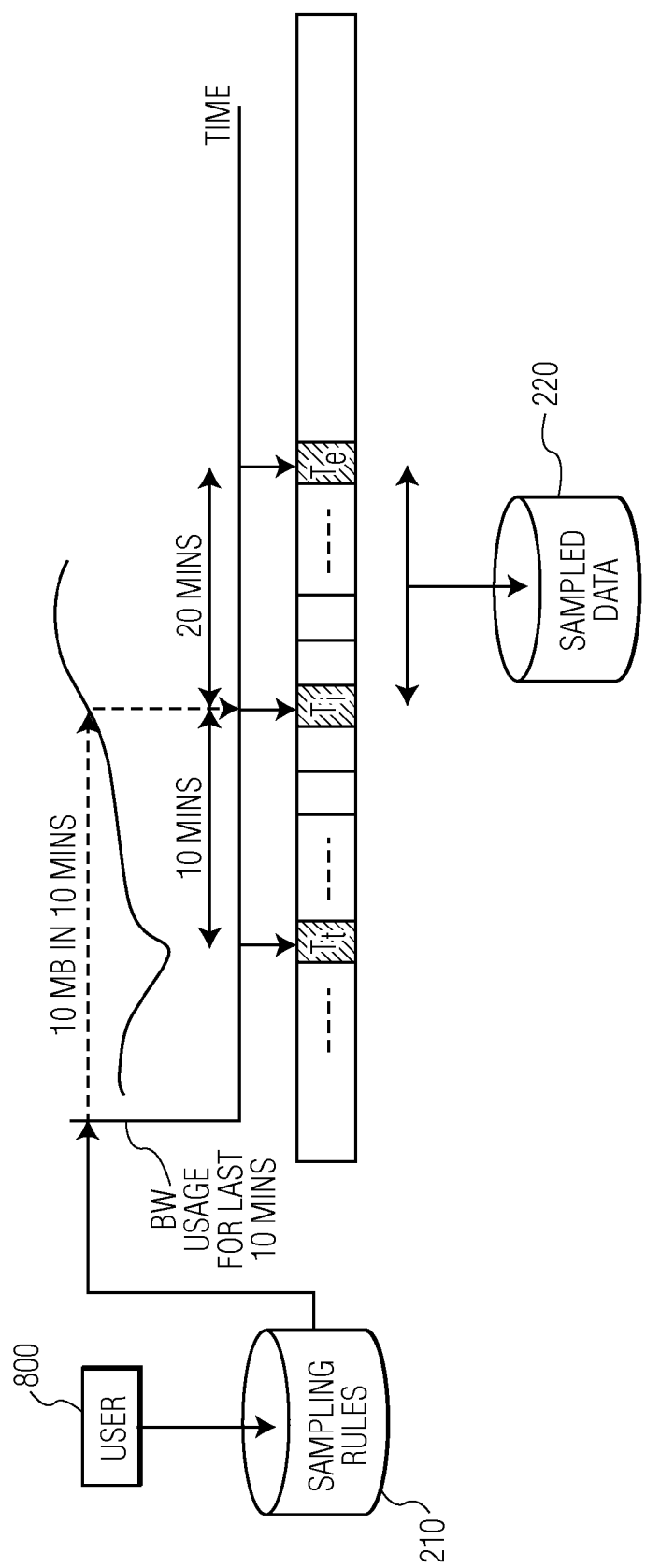
FIG. 8 illustrates an example of a sampling process executed by the sampling module using a static threshold in accordance with an embodiment of the invention.

An example of a sampling process using a static threshold in accordance with an embodiment of the invention is described with reference to FIG. 8. In this example, a user 800 wants to track bandwidth usage for a set of users. In particular, if the bandwidth used by any one of the specified users for the last 10 minutes exceeds 10 Megabytes (MB), the data of all the transactions for that selected user is sampled or collected up to the next 20 minutes. Thus, in this example, the user sets the static threshold to be 10 MB in 10 minutes and the Δt (the length of time after the criterion being tracked exceeds the threshold during which the data of all the transactions are sampled) to be 20 minutes.

In operation, the sampling module 208 measures or tracks a signal that correspond to the user-define criterion of bandwidth usage of selected users. In FIG. 8, the transaction $T_t$ corresponds to the time when the measurement of the signal started, the transaction $T_i$ corresponds to the time when the signal exceeds the threshold of 10 MB in 10 minutes and sampling starts, and the transaction $T_e$ corresponds to the time when the sampling stops based on the value of Δt, which in this example is 20 minutes. In this example, for the transactions between the transactions $T_i$ and $T_{ie}$, including the transactions $T_i$ and $T_e$, which are defined by the Δt of 20 minutes, the sampling module samples the data of all the transactions.

The sampling process performed by the sampling module 208 using the static threshold is now described in more detail. Initially, the user 800 sets the parameters of the sampling rules for the sampling module to follow. In this example, the static threshold is set for 10 MB in 10 minutes and the criterion is set for bandwidth usage per user over the last 10 minutes. The sampling module processes the data of the transactions using a pre-determined filter on bytes per transaction property of the transactions. As the data of the transactions is being processed, the sampling module updates the bandwidth usage per user for the last minutes as part of the transaction processing. The sampling module continuously checks to see if the criterion exceeds the threshold of 10 MB in the last 10 minutes. If this condition is satisfied for a particular user, the sampling module starts sampling all the data of the transactions for the particular user up to the user-defined time, which in this example is 20 minutes. In this example, if the user bandwidth usage is below normal, i.e., below 10 MB in the last 10 minutes, no transaction is collected using the sampling process.

Figure 9:
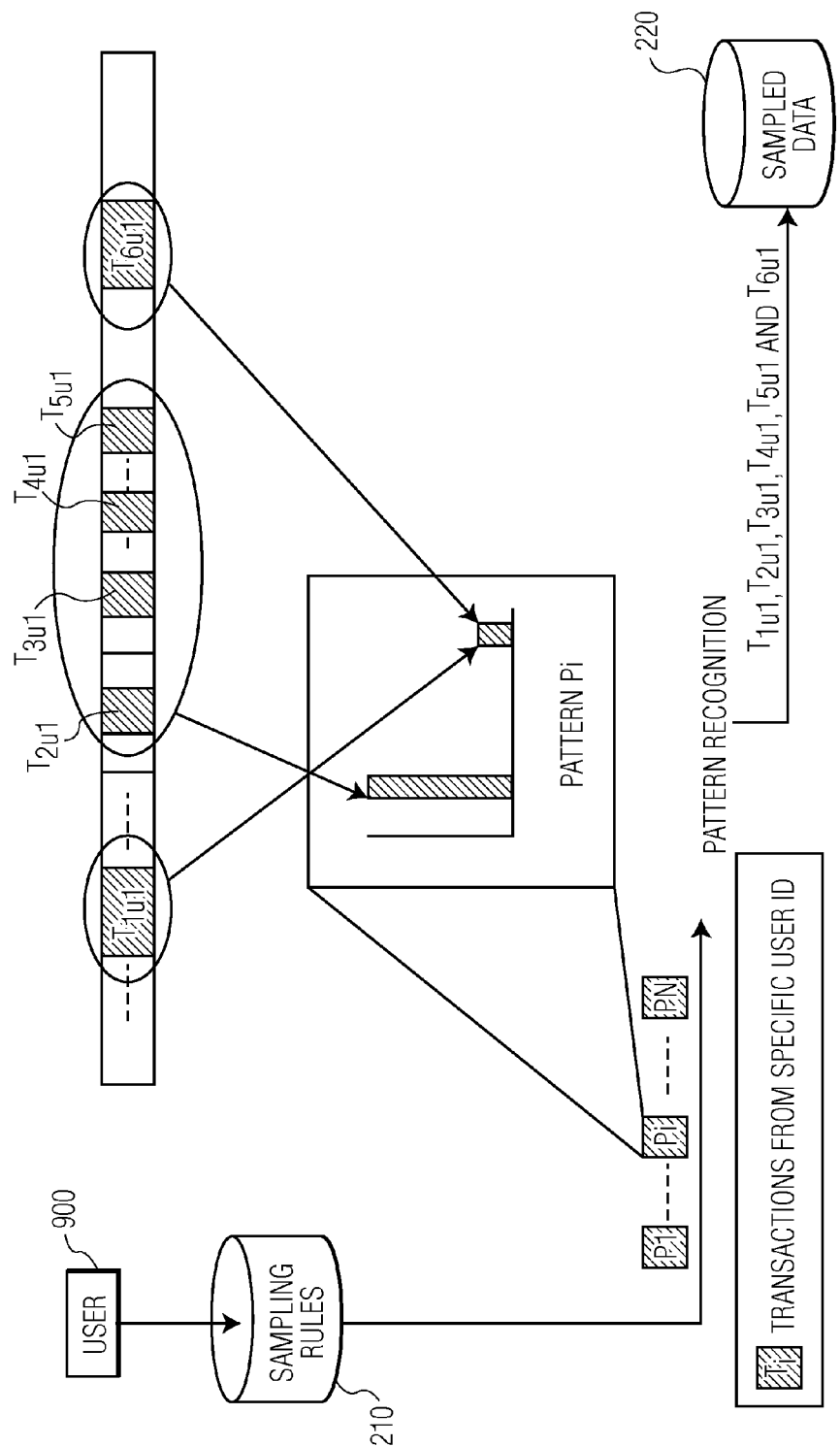
FIG. 9 illustrates an example of a sampling process executed by the sampling module using a dynamic threshold in accordance with an embodiment of the invention.

An example of a sampling process using a dynamic threshold in accordance with an embodiment of the invention is described with reference to FIG. 9. In this example, a user 900 wants to collect the data of transactions correlated to a concept, such as peer to peer (p2p) communication. In this example, the sampling module 208 maintains a histogram of packet size over a certain time window and if a certain bi-modal pattern is detected, the data of transactions during the time window is sampled or collected. In particular, if the pattern of the packet size histogram for a particular time window of 5 minutes, for example, the data of all transactions for that particular time window is sampled or collected. Thus, in this example, the user sets the sampling rules to "collect transactional data when there is an increased p2p activity." As a result, the dynamic threshold is set to one or more predefined p2p patterns and the time window is set for 5 minutes, which may be default settings or user-defined settings.

In operation, the sampling module 208 buffers the data of transactions being processed up to 10 minutes or another predefined period of time. The sampling module executes one or more pattern recognition algorithms to find increased p2p activity per user associated with transactions, including an algorithm that will identify bi-modal distribution of packet size. In FIG. 9, patterns P1 ... Pi ... PN for different periods of time are shown, and the pattern Pi is identified as a pattern for increased p2p activity for a selected user, i.e., the pattern Pi matches one of the patters of interest. For the pattern Pi, the transactions $T_{1u1}, T_{2u1}, T_{3u1}, T_{4u1}, T_{5u1}$ and $T_{6u1}$ are transactions belonging to a specific user ID for which the increased p2p activity has been identified. Thus, when the pattern Pi is identified or recognized as a pattern for increased p2p activity for the specific user ID, the data of the transactions $T_{1u1}, T_{2u1}, T_{3u1}, T_{4u1}, T_{5u1}$ and $T_{6u1}$ belonging to the same user ID is sampled or collected and stored in the sampled data warehouse database 220. In some embodiments, the sampling process performed by the sampling module may use both the static and dynamic thresholds in the manner described above.

The following advantages can be realized using the method and architecture for managing transaction data generated in a mobile or wireless communication network in accordance with embodiments of the invention:
  process and/or store only the transaction data that would be needed for key ad hoc queries needed by the customer.
  cheaper than products designed only for full blown ad hoc queries.
  small footprint and saves real estate space in data center.
  consume less power making it a greener solution.
  better suited for cloud based analytics since it reduces the bandwidth requirements.
  allow processing of large data volume while keeping the key attributes of the data set intact, allowing analytics solutions to provide reports with high statistical accuracy and for some data classes, with 100% statistical accuracy.

Figure 10:
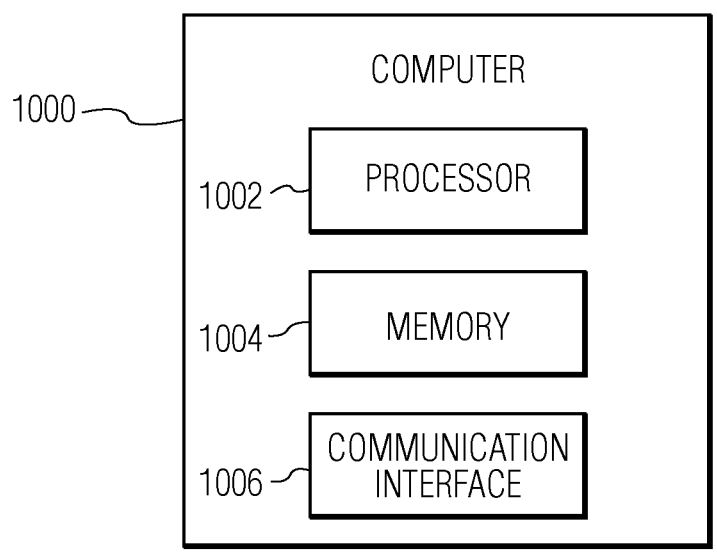
FIG. 10 depicts a computer that includes a processor, memory, and a communications interface in accordance with an embodiment of the invention.

In an embodiment, at least one of the functionalities of components of the transactional data management system 100, such as the sampling module 208 and the ETL module 214, is performed by a computer that executes computer readable instructions. FIG. 10 depicts a computer 1000 that includes a processor 1002, memory 1004, and a communication interface 1006. The processor may include a multifunction processor and/or an application-specific processor. Examples of processors include, without limitation, the PowerPC™ family of processors by IBM and the x86 family of processors by Intel. The memory within the computer may include, for example, storage medium such as read only memory (ROM), flash memory, RAM, and a large capacity permanent storage device such as a hard disk drive. The communication interface enables communications with other computers via, for example, the Internet Protocol (IP). The computer executes computer readable instructions stored in the storage medium to implement various tasks as described above.

Figure 11:
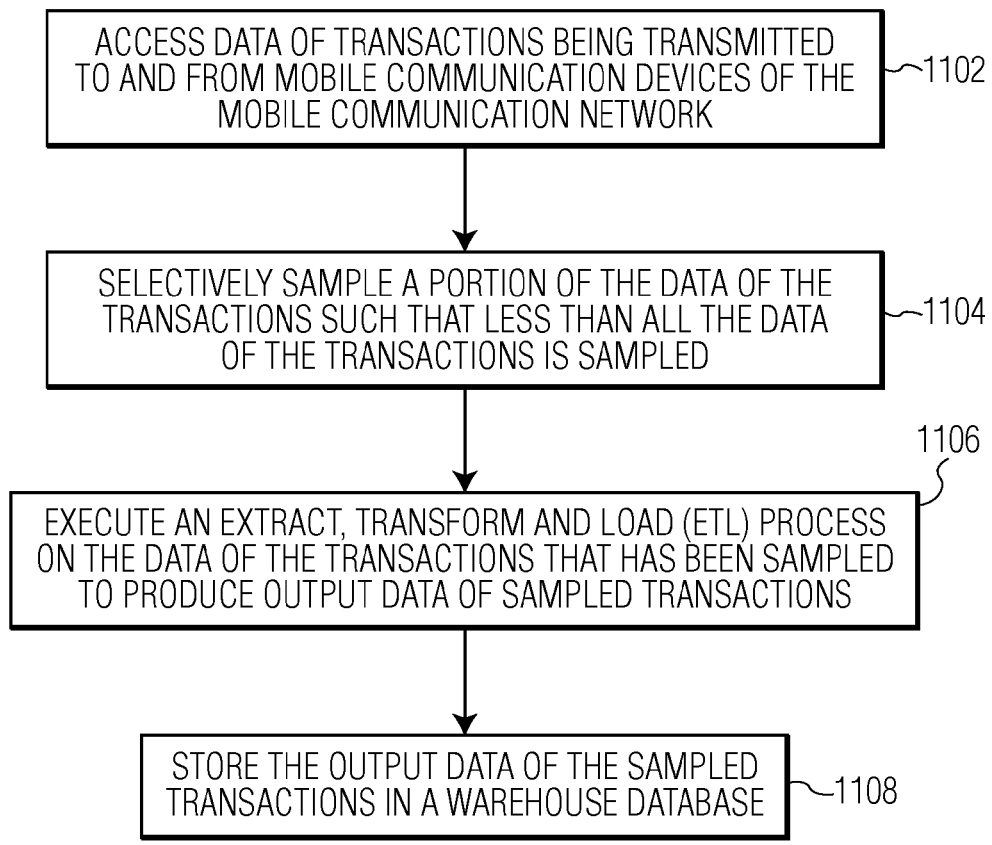
FIG. 11 is a flow diagram of a method for managing transactional data in a mobile communication network in accordance with an embodiment of the invention.

A method for managing transactional data in a mobile communication network in accordance with an embodiment of the invention is described with reference to a flow diagram of FIG. 11. At block 1102, data of transactions being transmitted to and from mobile communication devices of the mobile communication network is accessed. At block 1104, a portion of the data of the transactions is selectively sampled such that less than all the data of the transactions is sampled. At block 1106, an extract, transform and load (ETL) process is executed on the data of the transactions that has been sampled to produce output data of sampled transactions. At block 1108, the output data of the sampled transactions is stored in a warehouse database for use in data analytics reporting.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A system for managing transactional data generated in a mobile communication network, the system comprising:

a sampling module operably coupled to a mobile access network supporting a plurality of mobile communication devices to access data of transactions to and from the mobile communication devices, the sampling module being configured to selectively sample a portion of the data of the transactions such that less than all the data of the transactions is sampled; and an extract, transform and load (ETL) module operably coupled to the sampling module to execute an ETL process on the data of the transactions that has been sampled by the sampling module to produce output data of sampled transactions, the ETL module being configured to store the output data of the sampled transactions in a warehouse database, wherein operations of at least one of the sampling module and the ETL module are executed using one or more processors, wherein the sampling module is configured to sample data of M transactions out of N transactions that are accessed by the sampling module, where M and N are positive integers and M is smaller than N, and wherein the sampling module is configured to generate M random index numbers to select the M transactions out of the N transactions to be sampled using the M random index numbers.

2. The system of claim 1, wherein the sampling module is further configured to sample data of selected transactions out of the N transactions that have a common property as one of the M transactions.

3. The system of claim 1, wherein the sampling module is configured to generate new M random index numbers for every M transactions to select new M transactions out of every new N transactions to be sampled.

4. A system for managing transactional data generated in a mobile communication network, the system comprising:

a sampling module operably coupled to a mobile access network supporting a plurality of mobile communication devices to access data of transactions to and from the mobile communication devices, the sampling module being configured to selectively sample a portion of the data of the transactions such that less than all the data of the transactions is sampled; and an extract, transform and load (ETL) module operably coupled to the sampling module to execute an ETL process on the data of the transactions that has been sampled by the sampling module to produce output data of sampled transactions, the ETL module being configured to store the output data of the sampled transactions in a warehouse database, wherein operations of at least one of the sampling module and the ETL module are executed using one or more processors, and wherein the sampling module is configured to measure a signal over time, the signal corresponding to one or more criteria of the data of the transactions, and wherein the sampling module is configured to only collect data of new transactions during a predefined period of time after the signal exceeds a threshold.

5. The system of claim 4, wherein the sampling module is configured to only collect the data of the new transactions for one or more predefined mobile communication devices during the predefined period of time after the signal exceeds the threshold.

6. A system for managing transactional data generated in a mobile communication network, the system comprising:
- a sampling module operably coupled to a mobile access network supporting a plurality of mobile communication devices to access data of transactions to and from the mobile communication devices, the sampling module being configured to selectively sample a portion of the data of the transactions such that less than all the data of the transactions is sampled; and
- an extract, transform and load (ETL) module operably coupled to the sampling module to execute an ETL process on the data of the transactions that has been sampled by the sampling module to produce output data of sampled transactions, the ETL module being configured to store the output data of the sampled transactions in a warehouse database,
- wherein operations of at least one of the sampling module and the ETL module are executed using one or more processors, and
- wherein the sampling module is configured to perform pattern recognition on the data of the transactions within a time window to detect one or more patterns in the data of the transactions, and wherein the sampling module is configured to only collect the data of new transactions within a particular time window if one or more patterns are detected within the particular time window.

7. The system of claim 6, wherein the sampling module is configured to only collect the data of the new transactions for one or more predefined mobile communication device within the particular time window if one or more patterns are detected.

8. A non-transitory computer readable medium having a set of instructions that, when executed by a processor of a computer system, causes the computer system to perform a method for managing transactional data in a mobile communication network, the method comprising:
- accessing data of transactions being transmitted to and from mobile communication devices of the mobile communication network;
- selectively sampling a portion of the data of the transactions such that less than all the data of the transactions is sampled; and
- executing an extract, transform and load (ETL) process on the data of the transactions that has been sampled to produce output data of sampled transactions; and
- storing the output data of the sampled transactions in a warehouse database,
- wherein the selectively sampling includes sampling data of M transactions out of N transactions that are accessed, where M and N are positive integers and M is smaller than N, and
- wherein the selectively sampling includes generating M random index numbers to select the M transactions out of the N transactions to be sampled using the M random index numbers.

9. The non-transitory computer readable medium of claim 8, wherein the selectively sampling includes sampling data of selected transactions out of the N transactions that have a common property as one of the M transactions.

10. The non-transitory computer readable medium of claim 9, wherein the selectively sampling includes sampling the data of the selected transactions out of the N transactions that have the same user identification as one of the M transactions.

11. The non-transitory computer readable medium of claim 8, wherein the generating includes generating new M random index numbers for every M transactions to select new M transactions out of every new N transactions to be sampled.

12. A non-transitory computer readable medium having a set of instructions that, when executed by a processor of a computer system, causes the computer system to perform a method for managing transactional data in a mobile communication network, the method comprising:
- accessing data of transactions being transmitted to and from mobile communication devices of the mobile communication network;
- selectively sampling a portion of the data of the transactions such that less than all the data of the transactions is sampled; and
- executing an extract, transform and load (ETL) process on the data of the transactions that has been sampled to produce output data of sampled transactions; and
- storing the output data of the sampled transactions in a warehouse database,
- wherein the selectively sampling includes measuring a signal over time, the signal corresponding to one or more criteria of the data of the transactions, and wherein the selectively sampling includes only collecting data of new transactions during a predefined period of time after the signal exceeds a threshold.

13. The non-transitory computer readable medium of claim 12, wherein the selectively sampling includes only collecting the data of the new transactions for a particular mobile communication device during the predefined period of time after the signal exceeds the threshold.

14. A non-transitory computer readable medium having a set of instructions that, when executed by a processor of a computer system, causes the computer system to perform a method for managing transactional data in a mobile communication network, the method comprising:
- accessing data of transactions being transmitted to and from mobile communication devices of the mobile communication network;
- selectively sampling a portion of the data of the transactions such that less than all the data of the transactions is sampled; and
- executing an extract, transform and load (ETL) process on the data of the transactions that has been sampled to produce output data of sampled transactions; and
- storing the output data of the sampled transactions in a warehouse database,
- wherein the selectively sampling includes performing pattern recognition on the data of the transactions within a time window to detect one or more patterns in the data of the transactions, and wherein the selectively sampling includes only collecting the data of new transactions within a particular time window if one or more patterns are detected within the particular time window.

15. The non-transitory computer readable medium of claim 14, wherein the selectively sampling includes only collecting the data of the new transactions for a particular mobile communication device within the particular time window if one or more patterns are detected.

* * * * *